United States Patent Office 3,041,301
Patented June 26, 1962

3,041,301
THERMOSETTING, ELASTOMERIC POLYVINYL ACETATE ADHESIVES CONTAINING TRIMETHYLOL PHENOL
Walter B. Armour, Plainfield, N.J., assignor to National Starch and Chemical Corporation, New York, N.Y., a corporation of Delaware
No Drawing. Filed May 27, 1959, Ser. No. 816,062
5 Claims. (Cl. 260—29.3)

This invention relates to a method for the preparation of thermosetting, elastomeric polyvinyl acetate adhesives and to the adhesives thus produced.

It is the prime object of this invention to prepare thermosetting, elastomeric polyvinyl acetate adhesives whose films offer the unusual combination of excellent initial dry tack along with high ultimate bond strength, and which strengthen with age as a result of their thermosetting character. Other objects include the use of these adhesives for the bonding of non-porous structural materials and in such other applications as will become apparent to the practitioner during the course of this disclosure.

Before proceeding with a more complete description of the product of my invention, I will first explain a number of the terms, relating to adhesive technology, which appear in this disclosure. The term "thermosetting" refers to synthetic resin adhesives which solidify or set on heating or aging, i.e., curing, and cannot be remelted upon further heating. "Elastomeric" adhesives are adhesives displaying rubber-like properties, namely the ability to be stretched and to then return to their original shape. "Initial dry tack" refers to the adhesiveness or stickiness of adhesive films immediately after the loss of their organic solvent or aqueous carrier. Thus, some adhesives provide films which, upon loss of carrier, are hard and non-adhesive while others will provide films which while dry are nonetheless tacky and adhesive.

As is well known in the art, ordinary polyvinyl acetate adhesives yield initial films which are characterized by their hardness and absence of tack. In order to use these adhesives, the materials being bonded must, therefore, be contacted while the adhesive film is still moist; the latter being a procedure which is obviously difficult to comply with in many situations, especially where non-porous adherends are involved.

One method which has been used in an attempt to improve the properties of polyvinyl acetate adhesives involves their plasticization with compounds such as the low melting phthalate, adipate and sebacate esters. As a result of this treatment, these adhesives yield films which are, indeed, softer and tackier than films derived from the unplasticized form of the adhesive. However, these films are, in fact, too soft and possess very little strength upon curing. Furthermore, neither plasticized nor unplasticized polyvinyl acetate films exhibit any substantial degree of elastic recovery after being stretched, and are thus prone to deformation when under stress, such as results from the application of a static load.

Because of the above described undesirable properties, polyvinyl acetate adhesives are often decidedly limited in their application. As a result, the use of thermosetting adhesives which would continue to strengthen with age has at times been considered; but, in general, thermosetting adhesives have other disadvantages which have heretofore precluded their replacing the polyvinyl acetate types.

I have now discovered that the addition of trimethylol phenol to polyvinyl acetate or its copolymers results in the production of adhesives characterized by a novel combination of elastomeric and thermosetting properties which renders them far superior to ordinary polyvinyl acetate adhesives.

The adhesive products of my invention yield tacky films which do not require the application of excessive pressure for their successful bonding, even when dry, to a wide variety of surfaces including non-porous, structural materials. Upon curing, and even prior to curing, these films are found to be notably stronger than the respective cured or uncured films derived from ordinary plasticized polyvinyl acetate adhesives. This high strength is even more remarkable in view of the higher degree of initial elongation displayed by uncured films of my adhesives, in contrast with films derived from polyvinyl acetate adhesives plasticized with dibutyl phthalate. The latter is a compound which is commonly considered to be a very efficient plasticizer. This high initial elongation is indicative of good plasticization which is, of course, necessary for optimum contact type bonding (by contact type bonding I refer to bonding which does not require prolonged pressure but merely the instantaneous pressing together of the two dry, adhesive coated surfaces). However, a high percent of elongation, although desirable initially, is not desirable in the cured film, since that would allow excessive, undesirable movement of the adherends, i.e. the surfaces being bonded. In this respect the products of my invention are again outstandingly superior, as seen by the fact that when cured they show almost 300 times less elongation than conventionally plasticized polyvinyl acetate adhesives.

The high strength displayed by my adhesives in spite of their high percent initial elongation results from two factors. There is, first, a reinforcing action which manifests itself in the excellent elastic recovery of stretched films derived from these adhesives. In this process, the film molecules are stretched to their ultimate physical limits and then snap back to their original conformations. With ordinary polyvinyl acetate adhesives, on the other hand, no such recovery occurs and there is, instead, the undesirable phenomenon of "cold flow" in which the molecules comprising the film continue to stretch or flow on being subjected to strain until, finally, the film breaks. The reinforcing action of my adhesives is believed to be the result of the highly polar nature of the trimethylol phenol which, in effect, causes a molecular orientation of the polyvinyl acetate particles. The trimethylol phenol is aided in this action by its high degree of compatibility with polyvinyl acetate and its copolymers.

The other factor believed to be responsible for the high strength displayed by my adhesive products is the unusual "thermosetting" nature of their curing. With ordinary polyvinyl acetate adhesives, either plasticized or unplasticized, curing comprises merely the removal of organic solvent or, in the case of emulsions, the removal of water. During the curing of my adhesives, on the other hand, we have reason to believe that there is an actual reaction occurring between the trimethylol phenol and the solutions or emulsions of the vinyl acetate homo- or copolymers. Although we are not certain as to the exact mechanism of this reaction, the evidence for its existence is the unusual thermosetting character of my adhesive products, resulting in a continued strengthening, with time, of their cured films. This reaction has also been found effective in decreasing the water sensitivity of films derived from aqueous emulsions of my adhesive products. Such emulsions ordinarily contain hydrophilic emulsifiers which, if allowed to remain untreated, are noted for their adverse effect upon the water resistance of the ultimate polyvinyl acetate films.

The polyvinyl acetate, or its copolymers, to which the trimethylol phenol is to be added, may be either in solution in organic solvents or, more preferably, in the form of an aqueous emulsion. The latter has the advantage that the use of hazardous and expensive organic solvents is eliminated. It is to be noted, however, that the improved adhesive properties of my novel products are independent of the original physical form of the polyvinyl acetate or copolymers thereof. Thus, excellent elastomeric, thermosetting films will be obtained from organic solvent solutions as well as from aqueous emulsions of my products. Mention may also be made, at this time, of the possibility of employing alkaline, aqueous solutions of polyvinyl acetate copolymers in the process of my invention. These alkaline solutions are sometimes desirable, as it has been found difficult to dissolve or emulsify certain polyvinyl acetate copolymers under other than alkaline conditions. The alkali generally used for this purpose is ammonium hydroxide.

Regarding the polyvinyl acetate copolymers which may be used in the process of my invention, these may be copolymers of vinyl acetate with any polymerizable monomer, such for example as copolymers containing vinyl acetate in combination with: (1) alkyl esters of acrylic and methacrylic acid such as methyl acrylate, methyl methacrylate, ethyl acrylate, ethyl methacrylate, etc.; (2) substituted or unsubstituted mono and dialkyl esters of alpha, beta-unsaturated dicarboxylic acids such as the substituted and unsubstituted mono and dibutyl, mono and diethyl maleate esters as well as the corresponding fumarates, itaconates and citraconates; (3) anhydrides of alpha, beta-unsaturated dicarboxylic acids such as the anhydrides of maleic, fumaric, itaconic and citraconic acids; (4) alpha, beta-unsaturated carboxylic acids such as crotonic, acrylic, methacrylic, fumaric, maleic, itaconic and citraconic acids; (5) vinyl halides such as vinyl chloride; and, (6) vinylidene halides such as vinylidene chloride.

In addition to copolymers of vinyl acetate with one of the above described comonomers, it is also possible to combine trimethylol phenol with terpolymers of vinyl acetate wherein the vinyl acetate is reacted with any two of these comonomers. Furthermore, the homo-, co-, or terpolymers may be prepared by the practitioner with any desired solids content for use in the process of my invention.

The trimethylol phenol can be added to the polyvinyl acetate homo- or copolymers in all proportions ranging from fractional parts of the trimethylol phenol per unit weight of polyvinyl acetate, with no critical upper limit being apparent. The practitioner is thus free to produce systems which best suit his particular requirements. The actual preparation of my adhesives is accomplished merely by the mixing of the trimethylol phenol and polyvinyl acetate components. No heating or other special treatment is required for this operation.

These adhesives may be applied to the surfaces being bonded by any of the procedures known to the art including brush or roller coating as well as spraying. Curing may be accomplished by air drying at room temperature or by heating at elevated temperatures. Thus, a typical curing cycle comprises heating for 30 minutes at 130° C.

Typical applications in which my adhesive products find use are in the manufacture of garage doors wherein they are used for bonding wood or hardboard skins to wooden frames; as bonding agents for the adhesion of wood, metals or plastics to honeycomb cores; and, as adhesives for the bonding of foamed plastics to metal, wood, or plastic skins. Many other applications will, of course, present themselves to the practitioner.

The following examples will further illustrate the embodiment of my invention. In these examples all parts given are by weight unless otherwise noted.

*Example I*

This example illustrates the preparation of a number of different adhesive formulations.

In preparing these formulations, the procedure involved the addition of 100 parts of trimethylol phenol to the requisite quantity of a specific polyvinyl acetate homo-, or copolymer. The following table presents the complete data for all the formulations which were produced. All of these formulations were in the form of aqueous emulsions with the exception of #1, #4 and #17, which were organic solvent solutions, and #8, which was an aqueous, ammoniacal solution at a pH 7.5. Furthermore, all of the polyvinyl acetate polymers used were copolymers with the exception of #11 and #17, which were homopolymers and #12, which was a terpolymer. In the table, the column headed "Parts Polymer" represents the total parts, by weight of the polymer solution or polymer emulsion and not merely the polymer solids % in these solutions or emulsions. The chemicals listed under "Type of PVAc Polymer" represent, of course, the comonomer with which the vinyl acetate is polymerized.

| No. | Type of PVAc polymer | Ratio, VAc:Co-monomer | Polymer, Percent Solids | Parts Polymer | Parts Trimethylol Phenol |
|---|---|---|---|---|---|
| 1 | maleic anhydride copolymer in ethyl acetate solution. | 94:6 | 40 | 2 | 100 |
| 2 | vinyl chloride copolymer emulsion. | 40:60 | 50 | 5.3 | 100 |
| 3 | cyanoethyl half ester of maleic acid copolymer emulsion. | 97:3 | 50 | 11.1 | 100 |
| 4 | cyanoethyl half ester of maleic acid copolymer in toluene solution. | 97:3 | 30 | 11.1 | 100 |
| 5 | maleic acid copolymer emulsion. | 98:2 | 50 | 12.5 | 100 |
| 6 | ethyl acrylate copolymer emulsion. | 87:13 | 55 | 25 | 100 |
| 7 | acrylic acid copolymer emulsion. | 96:4 | 55 | 233 | 100 |
| 8 | aqueous crotonic acid copolymer solution. | 65:35 | 25 | 333 | 100 |
| 9 | dibutyl fumarate copolymer emulsion. | 78:22 | 55 | 400 | 100 |
| 10 | octyl acrylate copolymer emulsion. | 75:25 | 50 | 490 | 100 |
| 11 | homopolymer emulsion. | | 55 | 500 | 100 |
| 12 | dibutyl fumarate-acrylic acid terpolymer emulsion. | 58:42:2 | 50 | 566 | 100 |
| 13 | dibutyl maleate copolymer emulsion. | 85:15 | 55 | 666 | 100 |
| 14 | ethyl half ester of maleic acid copolymer emulsion. | 97:3 | 55 | 900 | 100 |
| 15 | dibutyl maleate copolymer emulsion. | 77:23 | 55 | 1,900 | 100 |
| 16 | vinylidene chloride copolymer emulsion. | 15:85 | 50 | 1,900 | 100 |
| 17 | homopolymer in ethyl acetate solution. | | 15 | 2,000 | 100 |
| 18 | acrylic acid copolymer emulsion. | 97:3 | 50 | 20,000 | 100 |

All of the above described formulations were successfully employed as adhesives for the bonding of a wide variety of wood, plastic and metal surfaces. The resulting adhesive bonds were, in all cases, superior to bonds achieved with either plasticized or unplasticized polyvinyl acetate adhesives in regard to such factors as the elastomeric properties of the initial films and the ultimate strength of the cured films.

*Example II*

This example illustrates several of the improved properties displayed by the adhesive products of my invention, in contrast to both plasticized and unplasticized polyvinyl acetate emulsion adhesives.

In this example are described the results of a number of tests which were run on both uncured and cured films derived from emulsions of my products, as well as from emulsions of plasticized and unplasticized polyvinyl acetate adhesives which did not contain the additive of my invention.

In preparing samples for these tests, an ordinary polyvinyl acetate emulsion having a solids content of 55%, by weight, was divided into three portions each of which contained 100 parts, by weight, of emulsion. One of the portions was converted into a typical product of my invention by the addition of 25 parts of trimethylol phenol. One of the two remaining portions was then plasticized by the addition of 25 parts of dibutyl phthalate. Four wet films, each 0.006″ thick and 6″ wide, were then cast from each of the three different emulsions onto sheets of polyethylene which were stretched taut over glass plates. All of these films were then air dried for 48 hours at a temperature of 20° C. and a relative humidity of 50%. Two of the air dried films, of each type, were then cured by heating at 130° C. for a period of 30 minutes. All of the cured and uncured films derived from each of the different emulsions were then tested for their % elongation, ultimate strength and % elastic recovery by means of the following techniques:

*Percent elongation and ultimate strength.*—The cured or uncured films, as prepared by the above procedure, were cut into 0.5″ strips, each strip having its long dimension parallel to the direction in which the film was originally cast. On to each of these film strips there were then inscribed two marks which were placed in the center of each strip and at a distance of 0.5″ from each other. The ultimate strength in pounds per square inch (p.s.i.), of each of the film strips was determined on an Instron Tensile Tester, as sold by the Instron Engineering Corp. of Quincy, Mass., at a loading rate of 2″ per minute. At the same time the percent elongation of each film strip was determined by following and measuring the separation of the inscribed marks with a pair of calipers.

*Percent elastic recovery.*—The cured or uncured films were cut into 0.5″ strips similar to those used in the procedure for determining percent elongation and ultimate strength. On to the center of each of these film strips there were then inscribed two marks which were placed at a distance of 1″ from each other. Each of the strips was then pulled, by hand, so that the marks were now 2″ apart whereupon tension was immediately released, a stop watch started, and the percent elastic recovery measured at the end of a one minute period.

The results of all of these tests, on both cured and uncured films, are presented below in tabular form.

| Uncured Films | PVAc Emulsion | PVAc Emulsion Plasticized with Dibutyl Phthalate | PVAc Emulsion+ Trimethylol Phenol |
|---|---|---|---|
| Ultimate Strength (p.s.i.) | 3,390 | 400 | 1,000 |
| Percent Elongation | 30 | 300 | 550 |
| Percent Elastic Recovery (1 min.) | (¹) | 32 | 80 |
| Cured Films: | | | |
| Ultimate Strength (p.s.i.) | 3,400 | 570 | 4,500 |
| Percent Elongation | (¹) | 300 | <5 |

¹ Could not be measured as film was too brittle.

The above data thus indicates the overall superiority of my adhesive products as contrasted with plasticized or unplasticized polyvinyl acetate emulsion adhesives.

Summarizing, my invention provides a polyvinyl acetate adhesive product which is unique in its combination of elastomeric and thermosetting characteristics. Variations may, of course, be made in procedures, proportions and materials without departing from the scope of my invention which is limited only by the following claims.

I claim:

1. A thermosetting, elastomeric adhesive composition comprising a mixture of trimethylol phenol and a vinyl polymer dispersed in a liquid medium, said vinyl polymer being selected from the class consisting of polyvinyl acetate and copolymers of vinyl acetate with other polymerizable monomers selected from the class consisting of alkyl esters of acrylic acid, alkyl esters of methacrylic acid, alpha, beta-unsaturated dicarboxylic acids, monoalkyl esters of alpha, beta-unsaturated dicarboxylic acids, dialkyl esters of alpha, beta - unsaturated dicarboxylic acids, anhydrides of alpha, beta-unsaturated dicarboxylic acids, vinyl halides and vinylidene halides.

2. The composition of claim 1 in which the vinyl polymer is in the form of an aqueous emulsion.

3. The composition of claim 1 in which the vinyl polymer is in the form of a solution in an organic solvent.

4. The composition of claim 1 in which the vinyl polymer is in the form of an aqueous alkaline solution.

5. A body coated with a film deposited from a liquid adhesive composition comprising a mixture of trimethylol phenol and a vinyl polymer selected from the class consisting of polyvinyl acetate and copolymers of vinyl acetate with other polymerizable monomers selected from the class consisting of alkyl esters of acrylic acid, alkyl esters of methacrylic acid, alpha, beta-unsaturated dicarboxylic acids, monoalkyl esters of alpha, beta-unsaturated dicarboxylic acids, dialkyl esters of alpha, beta-unsaturated dicarboxylic acids, anhydrides of alpha, beta-unsaturated dicarboxylic acids, vinyl halides and vinylidene halides.

References Cited in the file of this patent

UNITED STATES PATENTS

| 2,609,352 | Kvalnes | Sept. 2, 1952 |
| 2,889,297 | Brandner | June 2, 1959 |

FOREIGN PATENTS

| 228,214 | Switzerland | Nov. 1, 1943 |